United States Patent [19]
Stauffer

[11] Patent Number: 5,266,343
[45] Date of Patent: Nov. 30, 1993

[54] PASTEURIZATION PROCESS FOR DAIRY PRODUCTS

[76] Inventor: John E. Stauffer, 6 Pecksland Rd., Greenwich, Conn. 06831

[21] Appl. No.: 21,736

[22] Filed: Feb. 23, 1993

Related U.S. Application Data

[63] Continuation of Ser. No. 835,320, Feb. 14, 1992, abandoned.

[51] Int. Cl.⁵ .............................................. A23C 3/00
[52] U.S. Cl. ...................................... 426/522; 426/519
[58] Field of Search ................ 426/522, 519; 366/337, 366/338

[56] References Cited

U.S. PATENT DOCUMENTS

| | | | |
|---|---|---|---|
| 3,567,470 | 3/1971 | McElroy | 426/522 |
| 4,111,402 | 9/1978 | Barbini | 366/338 |
| 4,643,584 | 2/1987 | Allocca | 366/337 |
| 4,758,098 | 7/1988 | Meyer | 366/337 |
| 4,898,745 | 2/1990 | Zamzow et al. | 426/582 |
| 4,929,088 | 5/1990 | Smith | 366/337 |
| 4,973,488 | 11/1990 | Ernster | 426/522 |

*Primary Examiner*—George Yeung
*Attorney, Agent, or Firm*—Krass & Young

[57] ABSTRACT

A continuous process is provided for the pasteurization of dairy products. The process incorporates a holding tube that contains a static mixer. Improved control over the residence time of the dairy product is thereby obtained.

10 Claims, 1 Drawing Sheet

PASTEURIZATION PROCESS FOR DAIRY PRODUCTS

This is a continuation of co-pending application Ser. No. 07/835,320 filed on Feb. 14, 1992, now abandoned.

FIELD OF THE INVENTION

A continuous process is provided for the pasteurization of dairy products. The process incorporates a holding tube that contains a static mixer. Improved control over the residence time of the dairy product is thereby obtained.

BACKGROUND OF THE INVENTION

In the modern processing of dairy products, pasteurization is relied upon to provide safe and high quality products for consumers. Pasteurization consists of a heat treatment step that destroys harmful microorganisms while minimizing the development of off-flavors. In order to achieve these objectives, the proper combinations of pasteurization temperatures and holding times are used.

Originally, a batch process was relied upon to pasteurize dairy products, but this method has largely been replaced by continuous processes, which are more efficient and result in higher quality products. Several continuous pasteurization processes are available. For example, in the High-Temperature, Short-Time (HTST) pasteurization of raw milk, each particle of milk must be heated to 72° C. (161° F.) and held at this temperature for 15 seconds. In Higher-Heat, Shorter-Time (HHST) pasteurization, milk is heated to various higher temperatures and held at correspondingly shorter times than in HTST pasteurization. Ultra-High Temperature (UHT) pasteurization is used to achieve sterilization but at some sacrifice in taste of the treated product.

Pasteurization conditions in the United States and elsewhere are specified by regulations. In the United States, the *Grade "A" Pasteurized Milk Ordinance* specifies that the holding tube in an apparatus for continuous pasteurization shall be designed to provide for holding every particle of milk or milk product for at least the time required in the definition of pasteurization. Furthermore, the holding tube shall be so designed that the temperature difference between the hottest and coldest milk in any cross section of the flow will not be greater than 0.5° C. (1° F.). The holding tube shall be installed so that no portion between the inlet and the temperature sensor is heated.

*Milk Pasteurization Controls and Tests*, 2nd edition, Food and Drug Administration, 1986, specifies other conditions. The required length of the holding tube for HTST pasteurization is determined by a salt conductivity test. For HHST pasteurization, however, the sensitivity of the instruments for the salt conductivity test is not sufficient to measure the residence time accurately. Therefore, the assumption is made that the dairy product moves through the holding tube in laminar flow wherein the maximum fluid velocity at the tube centerline is twice the average velocity. Thus, in order to assure proper treatment of every particle of milk, the holding time must equal twice the specified time given in the definition for pasteurization. This requirement provides for a large margin of safety since it has been shown that even the most viscous dairy product will not achieve laminar flow, and in the case of condensed skim milk, the maximum velocity is only 1.7 times greater than the average velocity.

*3-A Sanitary Standards*, published by International Association of Milk, Food and Environmental Sanitarians, provide that in HTST pasteurization the holding tube, including its inlet and outlet connections, be constructed of sanitary pipe and fittings. Said pipe shall have product contact surfaces with a polished finish, free of all imperfections such as pits, folds, and crevices.

An empty pipe, as specified in the regulations, makes a poor holding tube for continuous pasteurization processes. As already noted, the product at the center of the pipe travels at nearly twice the average product velocity. Furthermore, the product at the wall moves more slowly than the average velocity. The result is that whereas the processing of the fastest moving product is optimal, the slower moving product will be overprocessed. Adjustments cannot be made to reduce the average holding time without incurring the danger of allowing some harmful microorganisms to escape in the treated product.

It is therefore an object of the present invention to provide a pasteurization process that will assure the complete destruction of harmful microorganisms and at the same time reduce the development of off-flavors and other undesirable properties.

A further object is to provide a process that is simple in design and economical to operate.

These and other objects, features, and advantages of the invention will be apparent from the accompanying drawing, FIG. 1, and from the following description.

SUMMARY OF THE INVENTION

The invention concerns a continuous process employing a holding tube for the pasteurization of dairy product, in which the holding tube, through which the product flows in order to achieve the proper residence time under pasteurization conditions, incorporates a static mixing device that has a mixing efficiency sufficient to even out or minimize the linear flow rate differences between the fastest moving particles of dairy product and the slowest moving particles of said product. In one preferred embodiment, the static mixing device consists of a series of disk and donut baffles in the holding tube. In another preferred embodiment, the static mixing device consists of a series of orifice plates in the holding tube. In still another preferred embodiment, the static mixing device consists of a series of spaced apart parallel baffles, alternately aligned in different directions, in the holding tube. In yet another preferred embodiment, the static mixing device consists of at least one fixed object in the holding tube positioned so as to induce shear in the dairy product as it flows through the tube.

BRIEF DESCRIPTION OF THE DRAWING

The invention will be better understood by reference to the preferred embodiment illustrated in the accompanying drawing.

Figure 1:
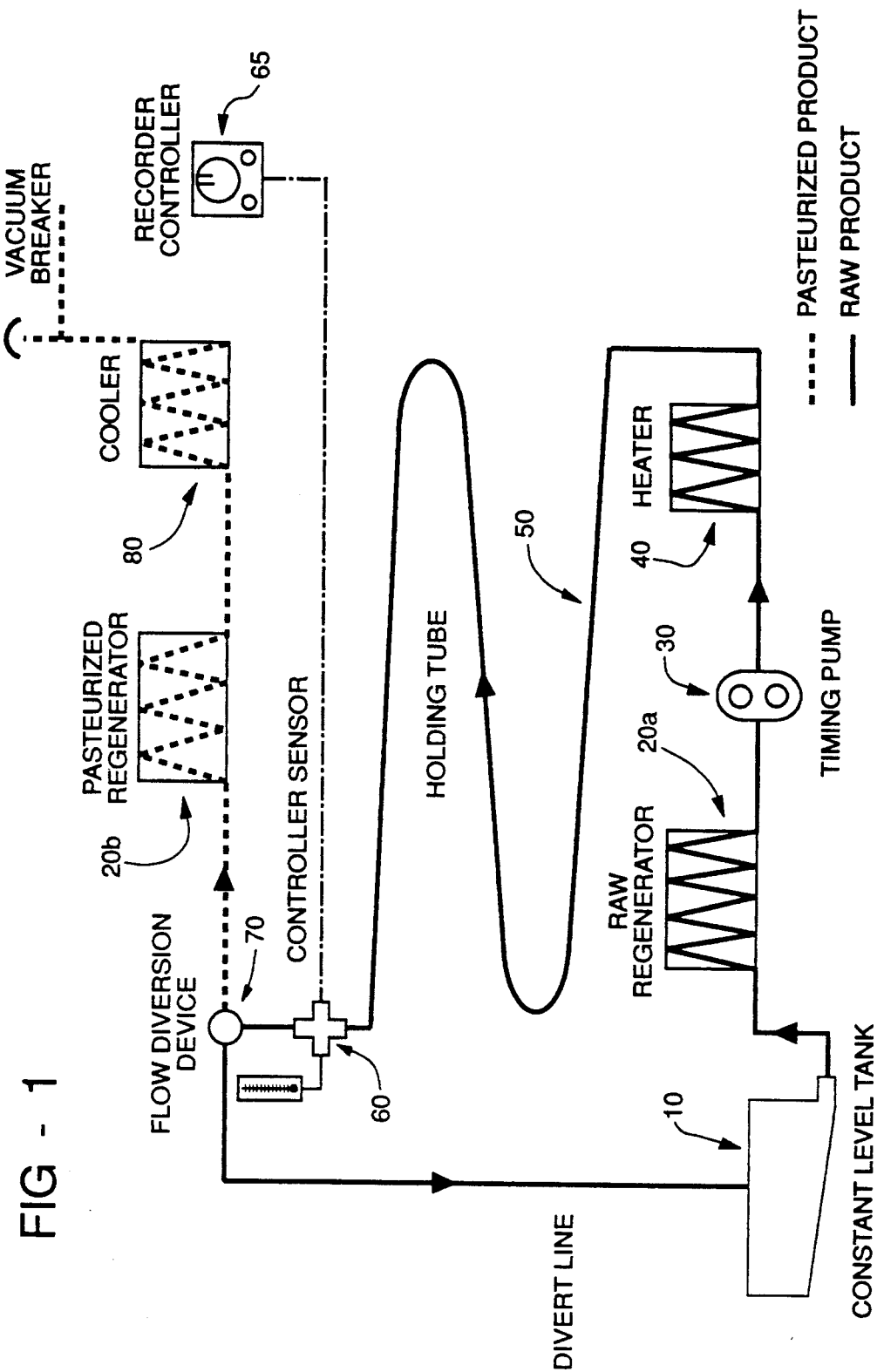
FIG. 1 is a diagrammatic view of the basic elements for an HTST pasteurization process. For the sake of simplicity many optional features are excluded.

The inset illustrates one type of baffle design used in the holding tube.

DETAILED DESCRIPTION OF THE PROCESS

In one preferred embodiment of the invention, raw milk is treated by HTST pasteurization as follows. Cold raw milk is drawn from a constant level tank (10) into the raw side of the regenerator (20a) where it is heated by hot pasteurized product. The timing pump (30) delivers the milk at a constant flow rate to the rest of the system. In the heater (40) the warmed milk is further heated by hot water or steam to the required pasteurization temperature Next, the milk flows through the holding tube (50) which contains a series of baffles to induce radial mixing. The pasteurized product is partially cooled in the pasteurized side of the regenerator (20b) and further cooled in the cooler (80).

Controls are provided to assure that the milk is heated to the proper temperature and held at that temperature for the required time interval in the holding tube. Timing pump controls (not shown) make sure that the milk is flowing at a rate no greater than specified so that its residence time in the holding tube is at least the required minimum. A controller sensor (60) and recorder controller (65) measure and record the temperature of the milk exiting from the holding tube. Product not sufficiently heated is diverted by the flow diversion device (70) to the constant level tank (10).

The holding tube is designed to take into account the radial mixing provided by the baffles contained therein. Such mixing evens out the differences between the fastest moving particles of dairy product, e.g., milk, and the slowest particles. Thus, the average holding time can approximate more closely the specified pasteurization time given in the regulations for each particle of milk.

The principles of fluid dynamics describe the motion of liquids through empty pipes. Liquids that are relatively viscous and move at slow speeds will exhibit laminar flow. Under such conditions, the maximum fluid velocity is twice the average velocity.

Less viscous liquids when moving at higher flow rates in larger diameter pipes will display turbulent flow. The maximum fluid velocity under these conditions is closer to the average velocity than in laminar flow. Even in turbulent flow, however, there are appreciable variations in the velocities at which different particles of fluid pass through the pipe. In either case, laminar or turbulent flow, the product that is near the wall of the pipe becomes stagnant and therefore traverses the holding tube at the slowest rate.

In order to overcome the limitations inherent in fluid flow, many proposals have been made to insert baffles into pipes so as to induce mixing. Such devices are commonly referred to as motionless mixers or static mixers. In such units there are no moving parts. The energy of the flowing fluid is utilized to produce the desired mixing. Design details for static mixing devices are given in U.S. Pat. Nos. 4,111,402; 4,643,584; 4,758,098; and 4,929,088 incorporated herein by reference.

The earliest designs of static mixers included disk and donut baffles, orifice plates, valves, and other devices and objects intended to induce shear. These primitive designs were inefficient mixers and required excessive pressure drops. As a result, considerable effort has been expended to improve the functionality of static mixers.

Newer, more sophisticated designs of static mixing devices employ parallel baffles, alternately aligned in different directions. These baffles split the incoming liquid stream into two or more layers or channels. These channels are continually split and recombined until a homogeneous mixture is attained. The channels provide controlled flow in a transversal or radial direction thereby reducing stagnation at the walls.

With their high mixing efficiencies, the newer static mixers can approximate plug flow conditions. In the ideal case of plug flow, every particle of fluid has the same residence time in the holding tube. Thus, under these conditions, every particle of product would be processed at the optimum parameters.

By installing static mixers in holding tubes for the pasteurization of dairy products, better control over processing can be obtained. Assurance can be made that the product will be safely processed. At the same time the development of off-flavors and other degradation products by over-processing can be minimized. The large margin of safety now used for empty pipes can be reduced without deleterious effects. The simplicity of static mixing designs, devoid of any moving parts, bearings, seals, or other maintenance-prone features, assures trouble-free operation.

Certain precautions must be exercised in the use of static mixers for pasteurization processes. The mixers must be fabricated from sanitary materials such as stainless steel. Baffles should be assembled so as to avoid crevices, pits, and other points where deposits of product can accumulate. The mixing unit should be self-draining so that it can be cleaned by clean-in-place (CIP) procedures.

The possible applications for pasteurization processes incorporating static mixers are manifold in the dairy industry. Uses include the pasteurization of milk, skim milk, cream, ice cream mixes, and yogurt mixes. Those products that are most viscous stand to benefit the greatest. Processes with severe processing conditions, such as UHT pasteurization, are likely to realize the greatest potential of static mixers.

The embodiments of the invention in which exclusive property or privilege is claimed are defined as follows.

I claim:

1. A continuous process employing a holding tube for the pasteurization of a liquid dairy product, in which the holding tube, through which the product flows in order to achieve the proper residence time under pasteurization conditions, incorporates a static mixing device that has a mixing efficiency sufficient to even out or minimize the linear flow rate differences between the fastest moving particles of dairy product and the slowest moving particles of said product.

2. A process according to claim 1 wherein the static mixing device consists a series of disk and donut baffles inserted into the holding tube.

3. A process according to claim 1 wherein the static mixing device consists of a series of orifice plates inserted into the holding tube.

4. A process according to claim 1 wherein the static mixing device consists of a series of parallel baffles, alternately aligned in different directions, inserted into the holding tube.

5. A process according to claim 1 wherein the static mixing device consists of a fixed object inserted into the holding tube so as to induce shear in the dairy product as it flows through the tube.

6. A process according to claim 1 wherein said liquid dairy product is milk.

7. A process according to claim 1 wherein said liquid dairy product is skim milk.

8. A process according to claim 1 wherein said liquid dairy product is cream.

9. A process according to claim 1 wherein said liquid dairy product is an ice cream mix.

10. A process according to claim 1 wherein said liquid dairy product is a yogurt mix.

* * * * *